United States Patent [19]

De Kock

[11] Patent Number: 5,566,796
[45] Date of Patent: Oct. 22, 1996

[54] ONE-PIPE SHOCK ABSORBER

[75] Inventor: Cornelis De Kock, Oud-Beijerland, Netherlands

[73] Assignee: Koni B.V., Oud-Beijerland, Netherlands

[21] Appl. No.: 505,335

[22] PCT Filed: Feb. 17, 1994

[86] PCT No.: PCT/NL94/00039

§ 371 Date: Aug. 17, 1995

§ 102(e) Date: Aug. 17, 1995

[87] PCT Pub. No.: WO94/19619

PCT Pub. Date: Sep. 1, 1994

[30] Foreign Application Priority Data

Feb. 19, 1993 [NL] Netherlands ............... 9300316

[51] Int. Cl.$^6$ ............... F16F 9/32; F16F 9/46
[52] U.S. Cl. ............ 188/299; 188/319; 188/322.15; 188/322.22; 267/64.15
[58] Field of Search ............... 188/299, 319, 188/322.15, 322.14, 280, 281, 282, 285, 316, 317, 318, 320, 322.13, 322.22; 267/64.15; 280/707

[56] References Cited

U.S. PATENT DOCUMENTS

| | | | |
|---|---|---|---|
| 967,285 | 8/1910 | Wilson | 188/319 |
| 2,579,058 | 12/1951 | Trimble et al. | 188/320 |
| 3,561,575 | 2/1971 | Allinquant | 188/282 |
| 3,827,538 | 8/1974 | Morgan | 188/319 |
| 3,937,307 | 2/1976 | De Kock | 188/319 |
| 4,121,704 | 10/1978 | Nicholls | 188/322.15 |
| 4,232,767 | 11/1980 | De Kock | 188/319 |
| 4,305,486 | 12/1981 | Cowan | 188/319 |
| 4,503,951 | 3/1985 | Imaizumi | 188/322.15 |
| 4,953,671 | 9/1990 | Imaizumi | 188/319 |
| 4,961,483 | 10/1990 | Yamaoka et al. | 188/299 |
| 5,018,608 | 5/1991 | Imaizumi | 188/322.15 |
| 5,044,474 | 9/1991 | DeKock | 188/299 |
| 5,133,434 | 7/1992 | Kikushima et al. | 188/299 |
| 5,207,300 | 5/1993 | Engel et al. | 188/282 |
| 5,242,038 | 9/1993 | Yamaoka | 188/322.15 |
| 5,248,014 | 9/1993 | Ashiba | 188/322.15 |

FOREIGN PATENT DOCUMENTS

| | | |
|---|---|---|
| 0545687 | 6/1993 | European Pat. Off. . |
| 2247644 | 5/1975 | France . |
| 2945015 | 10/1981 | Germany . |
| 3925763 | 2/1990 | Germany . |
| 57704 | 4/1969 | Luxembourg . |
| 645163 | 10/1950 | United Kingdom . |

*Primary Examiner*—Douglas C. Butler
*Attorney, Agent, or Firm*—Young & Thompson

[57] ABSTRACT

The construction of the shock absorber disclosed in DE-A-2945015 is independently adjustable in two directions however, the adjustment only leads to a variation in the pre-spring tensions in a fixed combination of valves. Only the magnitude of the damping forces may be adjusted, however not the characteristic. The construction of the shock absorber according to the present invention provides the possibility to adjust the characteristic.

5 Claims, 2 Drawing Sheets

ONE-PIPE SHOCK ABSORBER

The invention relates to a one-pipe shock absorber comprising a cylinder, a piston movable in said cylinder, fluid passages hollowed out in the piston, damping valves which close the passages until a certain fluid pressure is reached and means to enable the damping to be adjusted both for the outward stroke and for the inward stroke, as disclosed in DE-A-2945015.

In motor and motor cycle racing, shock absorbers are used which can be adjusted to changing circumstances because the damping force and damping characteristics can be adjusted without dismantling operations. It must be possible for this adjustment to take place in a simple manner in the pull direction and, independently thereof, in the push direction. These independent adjustment facilities are known in the case of known two-pipe shock absorbers. The one-pipe shock absorbers currently available commercially do not permit two independent adjustments. It is known to adjust a fluid flow in the shock absorber, especially at low damping speeds, with the aid of a regulating needle adjusting device. Drawbacks of this device are the poor reproducibility and the temperature sensitivity. Another known one-pipe shock absorber has an inwards adjustment device (for push) which is fitted in a separate tank connected to the shock absorber by means of a connecting pipe; the outwards adjustment device (for pull) is located in the piston rod. This shock absorber takes up a large amount of room, but a more serious drawback is that damping in the inwards direction is based on the displacement of fluid by means of the piston rod to the said tank, the fluid pressures having to be relatively high in order to achieve the specific damping force, in view of the restricted piston rod cross-section.

The aim of the invention is to provide a one-pipe shock absorber which is independently adjustable in the pull and push directions without dismantling the shock absorber from the vehicle, which takes up little room, which shows good reproducibility and low temperature sensitivity and which operates effectively, especially in the low to medium speed range in the damping characteristics.

According to the invention, the one-pipe shock absorber mentioned above is, to this end, characterised in that said passages are made both in a first damping disc for damping the outwards piston movement and in a second damping disc for damping the inwards piston movement, which damping discs are movably fitted in the piston with a fixed axial spacing relative to one another, in that a seating ring extends between the two damping discs and said spacing between the damping discs is greater than the height of the seating ring, so that when the one damping disc engages on the seating ring the other damping disc is clear of the seating ring, and in that the adjusting means for damping comprise a slide which is affixed to each damping disc and can be operated remotely, which slides are able, respectively, to close a larger or smaller number of passages in the damping discs.

To enable the damper to be adjusted easily close to the upper eye in the pull and push directions, each of the slides is connected to a rotating rod which extends through the hollow piston rod, which rotating rods are each provided with an adjusting element close to the upper eye of the shock absorber.

Preferably, each of the two slides is on the one hand provided with a finger which is connected to an adjuster plate which can be caused to rotate by means of a rotating rod and, on the other hand, provided with a stop finger, which is able to fall into stop recesses in the associated damping disc. For example, both adjusting devices each have eight discrete repeatable positions, each position corresponding to a complete damping characteristic.

In order to prevent extremely high damping forces arising at relatively high speeds, the piston also has one or more bypass holes which can be closed by a bypass valve, which bypass valve opens when the fluid pressure in the piston chamber is high.

Because both damping discs are connected with a mutual axial spacing and this spacing is somewhat greater than the height of the seating ring, the combination of damping discs functions as a non-return valve for both directions.

The seating ring can expediently be fitted in that it is pressed by means of a coupling nut, screwed on an external screw thread of the piston, and a pressure component against an internal shoulder of the piston.

The invention will now be explained in more detail with the aid of the figures.

Figure 1:
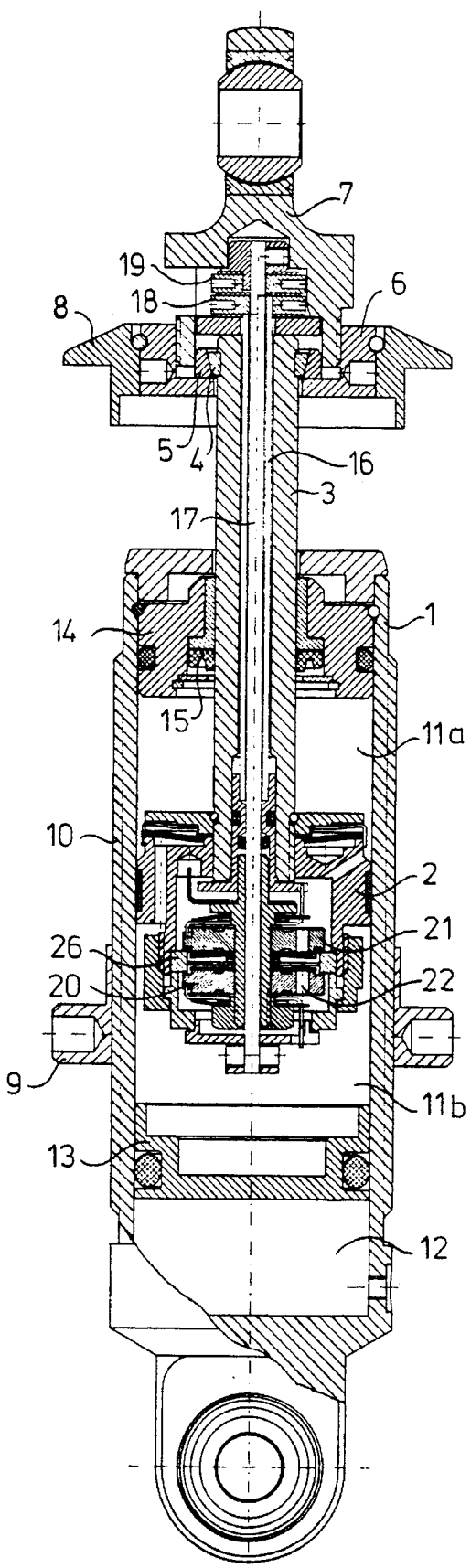
FIG. 1 shows an axial cross-section through a one-pipe shock absorber according to the invention.
Figure 2:
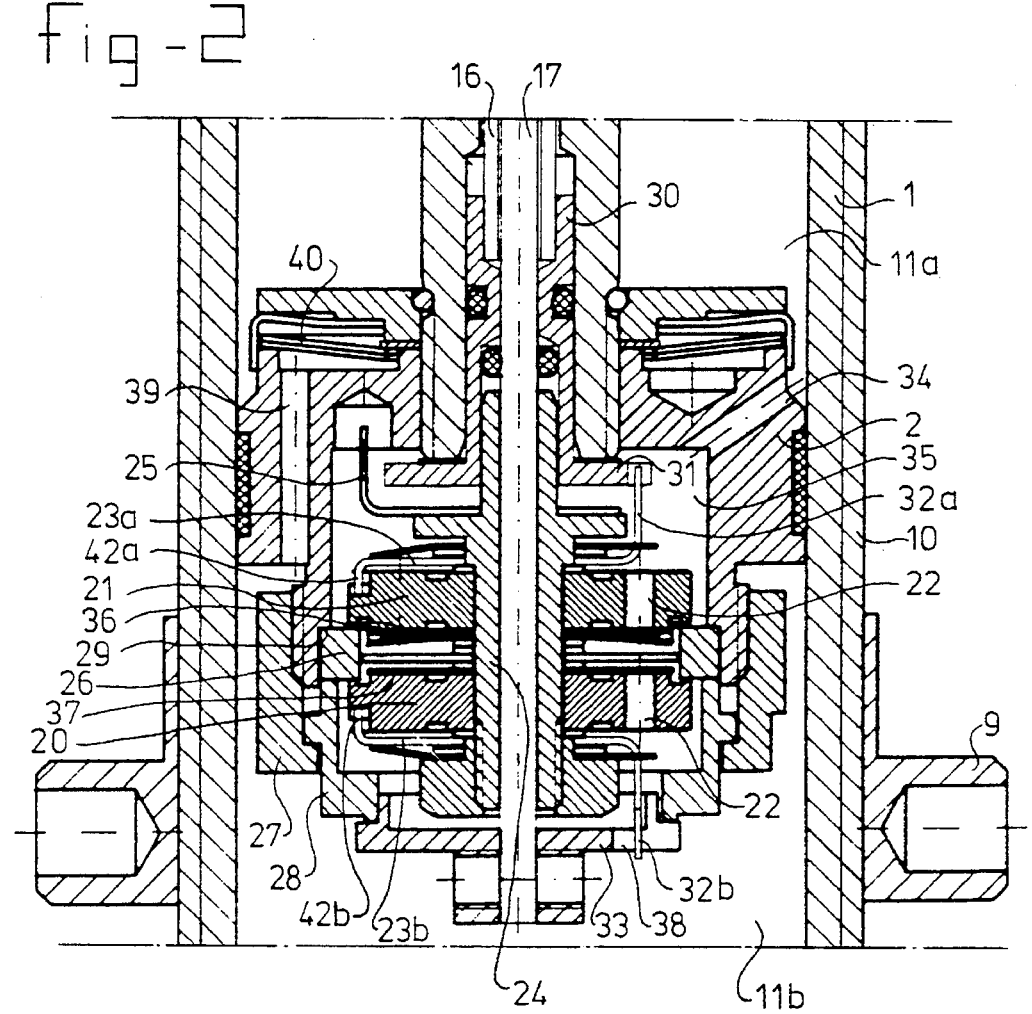
FIG. 2 shows a portion of FIG. 1 on an enlarged scale.

The construction shown comprises a cylinder 1 with a piston 2, which is movable therein and is attached to a hollow piston rod 3. Said rod is connected at its upper end by a gib 4 and a cotter 5 to a coupling nut 6, to which the upper eye 7 and a first spring seat 8 of the shock absorber are attached. A second spring seat 9 is adjustably attached to a housing 10 fitted on the outside of the cylinder 1. A helical spring is fitted between the two spring seats.

The piston 2 is movable in an oil chamber and divides said chamber into an upper and a lower cylinder chamber 11a and 11b respectively. The lower oil chamber 11b is separated from a gas chamber 12 by an isolating piston 13.

A guide 14, having a packing 15 which engages on the hollow piston rod 3, is located in the uppermost part of the upper oil chamber 11a. A hollow adjusting shaft 16, for outwards adjustment of the shock absorber, and an adjusting shaft 17, placed concentrically therein, for inwards adjustment of the shock absorber, extend within the hollow piston rod 3. The hollow adjusting shaft 16 can be turned by a lower adjusting wheel 18, whilst the hollow shaft 17 can be turned by an upper adjusting wheel 19. The two adjusting wheels 18, 19 are journalled in the upper eye 7.

The piston 2 contains a cavity in which two damping discs which form mirror images of one another are placed, the lower disc of which being indicated by 20 and the upper disc by 21. A series of passages 22, which can be closed or opened by means of a rotary slide 23, are made in each of said discs. The discs 20, 21 are positioned around a core piece 24, which is locked by a locking lip 25 so that it is unable to turn.

A seating ring 26, which is pushed by a cap nut 27 and a pressure component 28, which engages on said cap nut, against an internal shoulder 29 of the piston 2, is fitted between the two damping discs 20, 21. The discs 20, 21 are linked and can jointly execute a limited axial movement, the lower disc 20 engaging on the ring 26 in the upper position and the upper disc 21 engaging on the ring 26 in the lower position.

The lower end of the hollow shaft 16 is connected, via the rotating piece 30 welded to the hollow shaft 16 and positioned around the shaft 17, to a flange-shaped adjuster plate 31, which, in turn, is connected via a finger 32a to a slide 23a and can rotate said slide. The lower end of the shaft 17 is connected to an adjuster plate 33, which, in turn, is connected via a finger 32b to slide 23b.

Figure 3:
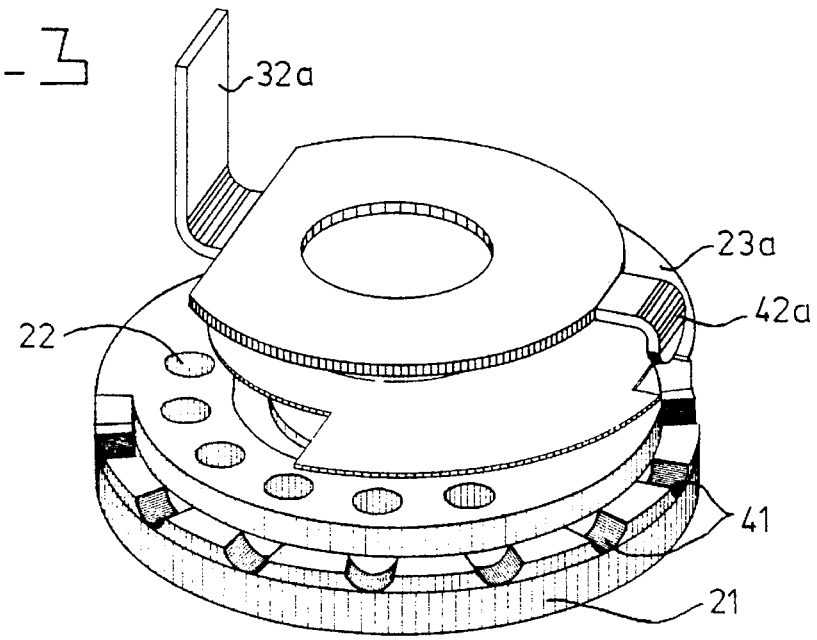
FIG. 3 shows an exploded view of the uppermost adjusting element.

FIG. 3 shows the appearance of the slide 23a and it will be clear that a larger or smaller number of the passages 22 in the upper damping disc 21 are closed by turning the slide 23a with the aid of the lower adjusting wheel 18 via the hollow shaft 16. A larger or smaller number of the passages 22 in the lower damping disc 20 can be closed in the same way if the slide 23b is turned with the aid of the upper adjusting wheel 19.

In addition, one or more holes 34 are bored in the piston 2, which holes connect the upper oil chamber 11a with the internal chamber 35 of the piston 2.

A damping valve system 36 is located directly beneath the upper damping disc 21 and is able to open when there is sufficient oil pressure in the exposed holes 22 of said disc 21. A damping valve system 37 is positioned directly above the lower damping disc 20 and is able to open when there is sufficient oil pressure in the exposed holes 22 of said disc 20. The adjuster plate 33 is provided with an oil passage slit 38.

In addition, bypass holes 39 are bored in the piston 2, which holes can be closed by means of a spring-loaded valve 40.

The two damping discs 20, 21 are provided with stop recesses 41, in which a stop finger 42a or, respectively, 42b of the associated discs 23a, 23b is able to fall. Each position corresponds to a complete damping characteristic.

The shock absorber functions as follows:

The number of holes 22 in each of the damping discs 20, 21 which are not covered by a slide 23a or 23b can be selected by turning the adjusting wheels 19, 18, each click corresponding to a specific position of the slide 23a or 23b and, thus, to a specific number of covered holes 22 and, thus, to a specific damping characteristic.

When the piston 2 moves upwards, oil will flow from the chamber 11a through the holes 34 to the piston chamber 35. The upper damping disc 21 will be pressed onto the seating ring 26 and the lower damping disc 20, which is at a fixed distance from the upper damping disc 21, will come away from the seating ring 26. The oil can flow through the holes 22 in the upper disc 21 which are not covered by the slide 23a to the damping valve system 36, which is opened by the oil pressure so that oil can flow through the gap between the seating ring 26 and the disc 20. This oil leaves the piston chamber 35 via the slit 38 in the adjuster plate 33 and enters the chamber 11b. At relatively high speeds of the piston 2, or if the slide 23a of the upper damping disc 21 closes a large proportion of the passages 22 in said disc, the pressure in the chamber 11a will be able to rise to such an extent that the valves 40 open and oil can flow via the bypass holes 39 directly into the chamber 11b.

When the piston 2 moves downwards, the oil will have to flow from the chamber 11b to the chamber 11a. The lower damping disc 20 comes to lie against the seating ring 26 and the upper damping disc 21 comes away from said ring 26. If the slide 23b leaves a large number of passages 22 in the lower damping disc 20 open, oil will flow through said passages 22 and the opened damping valve 37 and enter the chamber 11a via the holes 34.

If the piston speed is increased and/or further passages 22 in the lower damping disc 20 are closed, the pressure drop over the piston 20 increases. If a specific pressure drop is exceeded, the valves 40 open and oil is able to flow via the bypass holes 39 directly into the chamber 11a.

The most important advantages of the construction according to the invention are:

1. that the shock absorber is independently adjustable in the pull and push directions,
2. that the shock absorber does not have to be dismantled from the vehicle for adjustment,
3. that the shock absorber takes up little space,
4. that good reproducibility is achieved,
5. that the shock absorber shows hardly any sensitivity to temperature,
6. that the shock absorber operates effectively in respect of the damping characteristics, especially in the low to medium speed range, and
7. that the upper eye of the shock absorber can be dismantled.

I claim:

1. One-pipe shock absorber comprising a cylinder (1), a piston (2) movable in said cylinder, fluid passages (22) hollowed out in the piston, damper valves (36, 37) which close the passages until a certain fluid pressure is reached and means to enable the damping to be adjusted both for the outward stroke and for the inward stroke, characterised in that said passages (22) are made both in a first damping disc (21) for damping the outwards piston movement and in a second damping disc (20) for damping the inwards piston movement, which damping discs (21, 20) are movably fitted in the piston with a fixed axial spacing relative to one another, in that a seating ring (26) extends between the two damping discs (21, 20) and said spacing between the damping discs is greater than the height of the seating ring (26), so that when one of said damping discs engages on the seating ring the other of said damping disc is clear of the seating ring, and in that the adjusting means for damping comprise a slide (23a, 23b) which is affixed to each damping disc and can be operated remotely, which slides are able, respectively, to close a larger or smaller number of passages (22) in the damping discs (20, 21).

2. Shock absorber according to claim 1, characterised in that each of the slides (23a and 23b respectively) is connected to a rotating rod (16 and 17 respectively) which extends through the hollow piston rod (3), which rotating rods are each provided with an adjusting element (18, 19) close to the upper eye of the shock absorber.

3. Shock absorber according to claim 1, characterised in that one or more bypass holes (39), which can be closed by means of a bypass valve (40), are additionally present in the piston (2), which bypass valve (40) opens when the fluid pressure in the piston chamber (35) is high.

4. Shock absorber according to claim 2, characterised in that each of the two slides (23a, 23b) is provided with a finger (32a and 32b respectively) which is connected to an adjuster plate (31 and 33 respectively) which can be caused to rotate by means of a rotating rod (16 and 17 respectively) and, is provided with a stop finger (42a and 42b respectively), which is able to fall into stop recesses (41) in the associated damping disc (21 and 20 respectively).

5. Shock absorber according to claim 1, characterised in that the seating ring (26) is pressed by means of a coupling nut (27), screwed on an external screw thread of the piston, and a pressure component (28) against an internal shoulder (29) of the piston (2).

* * * * *